US009800657B2

(12) United States Patent
Tagawa

(10) Patent No.: US 9,800,657 B2
(45) Date of Patent: Oct. 24, 2017

(54) ALLOCATING DATA TO PLURALITY STORAGE DEVICES

(75) Inventor: Hiroaki Tagawa, Nara (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 209 days.

(21) Appl. No.: 13/503,690

(22) PCT Filed: Aug. 16, 2011

(86) PCT No.: PCT/US2011/047954
§ 371 (c)(1),
(2), (4) Date: Apr. 24, 2012

(87) PCT Pub. No.: WO2013/025206
PCT Pub. Date: Feb. 21, 2013

(65) Prior Publication Data
US 2013/0046780 A1    Feb. 21, 2013

(51) Int. Cl.
*G06F 17/30* (2006.01)
*H04L 29/08* (2006.01)

(52) U.S. Cl.
CPC .... *H04L 67/1097* (2013.01); *G06F 17/30566* (2013.01)

(58) Field of Classification Search
CPC .......... G06K 9/00288; H04N 1/00331; H04N 1/00336; G06F 17/30864; G06F 17/30241; G06F 17/30566; G06F 17/30867; G06F 17/30286; G06F 17/30595; G01C 21/32; G06Q 30/02
USPC ....................................... 455/556.1; 707/769
See application file for complete search history.

(56) References Cited

U.S. PATENT DOCUMENTS

| | | | |
|---|---|---|---|
| 6,601,061 B1 * | 7/2003 | Holt | G06F 17/30864 |
| 8,131,712 B1 * | 3/2012 | Thambidorai | G06F 17/30864 |
| | | | 707/610 |
| 2003/0037094 A1 * | 2/2003 | Douceur | G06F 17/30156 |
| | | | 709/201 |
| 2003/0110185 A1 * | 6/2003 | Rhoads | G01C 21/32 |
| 2007/0005653 A1 | 1/2007 | Marsh | |
| 2010/0046842 A1 | 2/2010 | Conwell | |
| 2010/0076985 A1 | 3/2010 | Egnor | |
| 2010/0293206 A1 | 11/2010 | Ylonen | |

(Continued)

FOREIGN PATENT DOCUMENTS

| | | |
|---|---|---|
| JP | 2837364 B2 | 12/1998 |
| JP | 2943791 B2 | 8/1999 |
| JP | 11259493 A | 9/1999 |

(Continued)

OTHER PUBLICATIONS

United States Patent and Trademark Office, International search report & written opinion of the searching authority, dated Jan. 5, 2012.

*Primary Examiner* — Cam-Y Truong
(74) *Attorney, Agent, or Firm* — Brundidge & Stanger, P.C.

(57) ABSTRACT

Techniques are generally described for allocating data to at least one of a plurality of storage devices. Example techniques may include associating the data with at least one geographical characteristic, and allocating the data to at least one of the plurality of storage devices based on the geographical characteristic.

11 Claims, 5 Drawing Sheets

(56) References Cited

U.S. PATENT DOCUMENTS

2011/0143811 A1 6/2011 Rodriguez
2012/0016929 A1* 1/2012 Travieso .............. G06F 17/2827
    709/203

FOREIGN PATENT DOCUMENTS

| JP | 11296460 A | 10/1999 |
| JP | 2004-053825 | 2/2004 |
| JP | 3531198 B2 | 5/2004 |
| JP | 2004-347732 | 12/2004 |
| JP | 2005-266981 | 9/2005 |
| JP | 3743508 B2 | 2/2006 |
| JP | 2006092308 A | 4/2006 |
| JP | 4218348 B2 | 2/2009 |
| JP | 2009-300573 | 12/2009 |
| JP | 2011086066 A | 4/2011 |

* cited by examiner

ALLOCATING DATA TO PLURALITY STORAGE DEVICES

CROSS-REFERENCE TO RELATED APPLICATION

This Application is the U.S. National Stage filing under 35 U.S.C. §371 of International Application No. PCT/US2011/047954, filed on Aug. 16, 2011.

BACKGROUND

A data storage system may include plural storage devices that stores data for later search and retrieval. For example, a search system may include plural data storage centers having storage devices all over the world. The data storage system may have various tasks that need to run constantly or on irregular basis. When the data storage system stores numerous data at the plural data storage devices, performance of the data storage system to run tasks may become lower speed.

Unless otherwise indicated herein, the materials described in this section are not prior art to the claims in this application and are not admitted to be prior art by inclusion in this section.

SUMMARY

The present disclosure describes a method of allocating the data to at least one of a plurality of storage devices. Some example methods may include associating the data with at least one geographical characteristic, and allocating the data to at least one of the plurality of storage devices based on the geographical characteristic.

The present disclosure also describes a computer device. Some example computer devices include an associating unit and an allocating unit. The associating unit may be arranged to associate the data with at least one geographical characteristic. The allocating unit may be operable to allocate the data with at least one of a plurality of storage devices based on the geographical characteristic.

Also described is a system including a plurality of storage devices and a computer device. The plurality of storage devices may be arranged to store the data. Some example computer devices may include associating the data with at least one geographical characteristic, and allocating the data to at least one of the plurality of storage devices based on the geographical characteristics.

The present disclosure further includes a computer readable storage medium. Some example computer readable storage media having contents, when executed by a computer, may cause a computer to associate data with at least one geographical characteristic, and allocate the data to at least one of plurality of storage devices based on the geographical characteristic.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
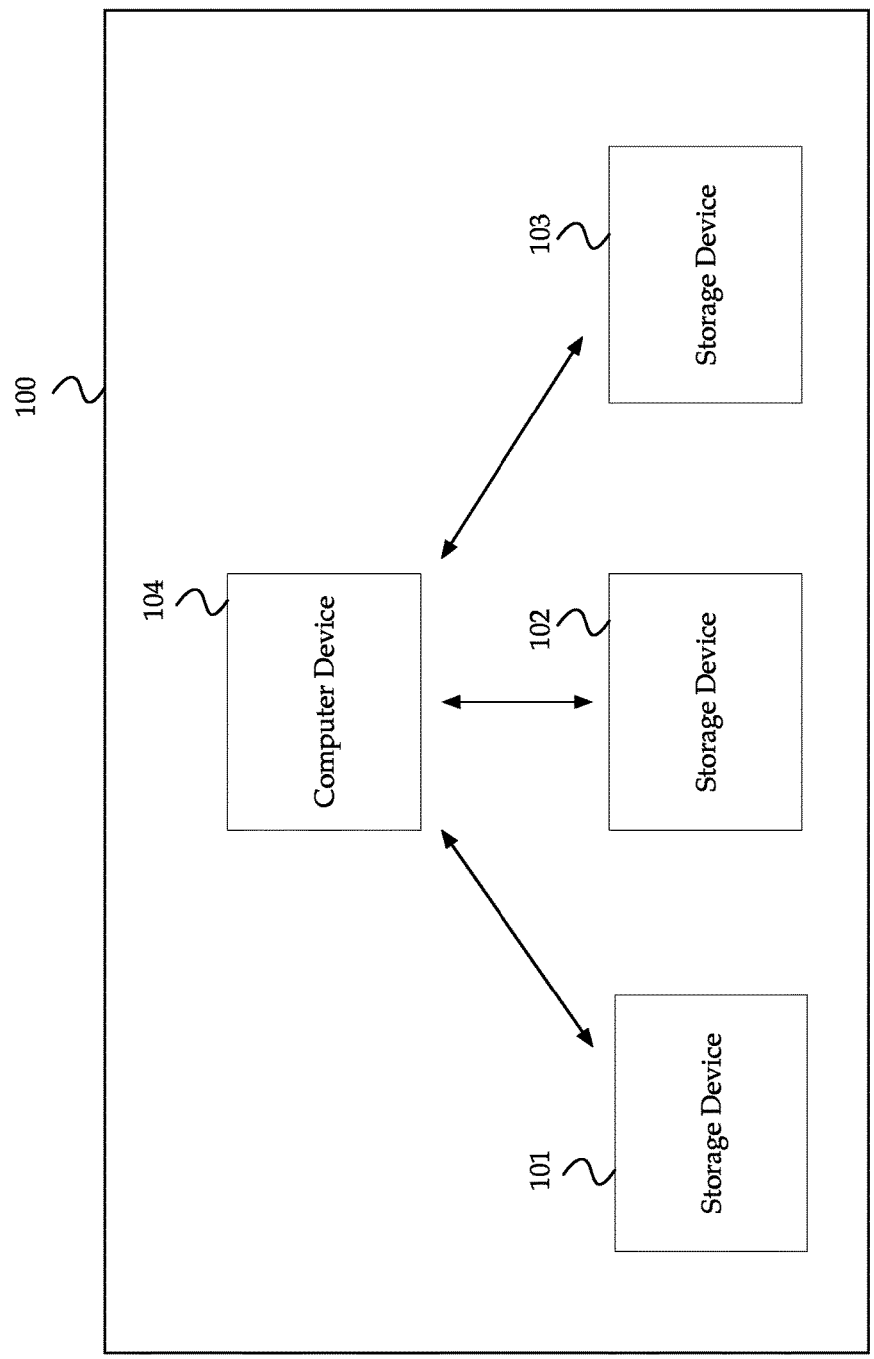
FIG. 1 is a block diagram illustrating an example data allocating system having plural storage devices.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to data allocating systems having plural storage devices and, more particularly, to data allocating to an appropriate storage device based on the geographical characteristic.

Briefly stated, examples of data allocating methods to at least one of a plurality of storage devices are generally described. The data allocating method may include associating the data with at least one geographical characteristic, and allocating the data to at least one of the plurality of storage devices based on the geographical characteristic. In some example data allocating systems, data may be re-allocated from one storage device to another storage device at any timing, when storage device becomes insufficient physical space, for example. This is within the scope of the disclosure to include the data allocating.

FIG. 1 is a block diagram illustrating an example data allocating system having plural storage devices arranged in accordance with at least some embodiments of the present disclosure. An example data allocating system 100 may include a plurality of storage devices 101, 102, and/or 103, and computer device 104. The storage devices 101, 102, 103 may be configured to: receive data from the computer device 104, store the data, and provide data in response to the data request. An example data allocating system 100 may include one or more 101, 102, and/or 103, each storage devices having different memory capacities. In other words, a data allocating system 100 may include petabyte scale storage. Each storage device may include a datacenter having plural storage devices. In some examples, storage devices may be located different geographical places.

In some example embodiments, storage devices may include different capabilities. For example, one storage device 101 may be a cache memory, another storage device 102 may be a hard disk drive and another storage device 103 may be a removable media.

In the example embodiment of FIG. 1, a computer device 104 may be configured to allocate data to an appropriate storage device. To allocate the data to an appropriate storage device, the data allocating methods described herein may be implemented by a computer device 104 connected to plural storage devices. In some examples, the computer device 104 may connect storage devices by wired or wireless via the Internet, LAN, or any other various connections. The computer device 104 may be configured to analyze data, associate the data with at least on geographical characteristic, determine the storage device to store the data, and allocate the data to the storage device based on the geographical characteristic.

Figure 2:
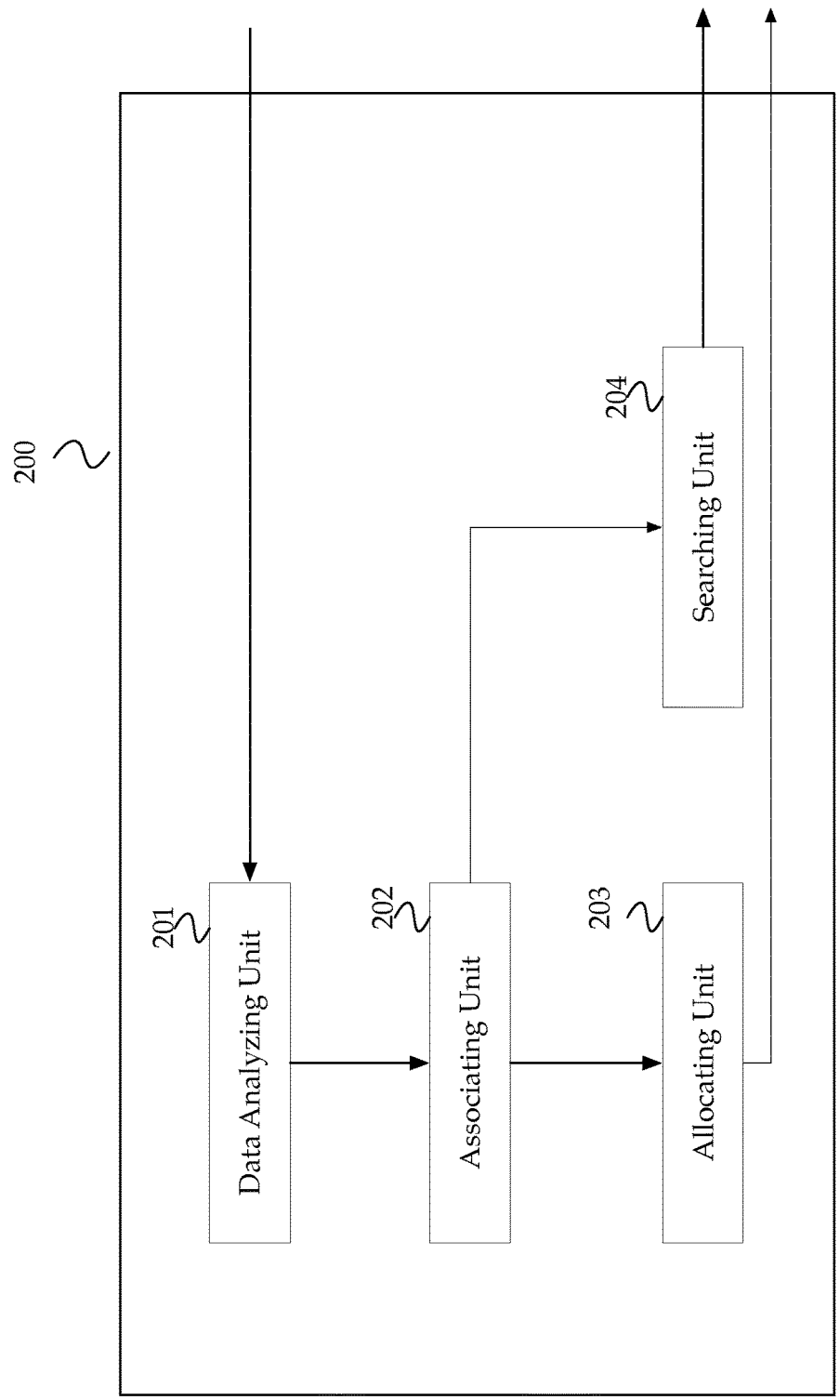
FIG. 2 is a block diagram illustrating an example computer device.

FIG. 2 is a block diagram illustrating an example computer device arranged in accordance with at least some embodiments of the present disclosure. An example computer device 200 may include functional and/or physical portions as follows: a data analyzing unit 201, an associating unit 202, an allocating unit 203, and a searching unit 204. Although illustrated as discrete portions, the various functions and/or physical partitions are merely examples, and the various functions and/or physical partitions can be separated into additional portions, combined into fewer portions, or eliminated based on the specific requirements of the implementation.

In some example embodiments, the data analyzing unit 201 may be configured to analyze data which may be allocated at least one of a plurality of storage devices (e.g., storage devices 101, 102 and/or 103 of FIG. 1), when the computer device 200 receives the data. The data may contain text, music, sound, image, picture, and/or movie. In some example embodiments, the data analyzing unit 201 may analyze used language of text in the data. The analysis may be executed using a text-language identification method as disclosed in Japanese Patent No. 2943791, or No. 2837364, which is incorporated by reference. In some example embodiments, the data analyzing unit 201 may analyze used language of speech in the sound data. The analysis may be executed using a speech-language identification method as disclosed in Japanese Patent Application Publication No. 2004-53825, 2004-347732, 2009-300573, or Japanese Patent No. 3531198, which is incorporated by reference. This method may use speech recognition system.

In some example embodiments, the data analyzing unit 201 may analyze a music-genre of music in the data. The analysis may be executed using a music-genre identifying method as disclosed in Japanese Patent No. 3,743,508, which is incorporated by reference. In some example embodiments, the data analyzing unit 201 may analyze a race of a face image of a picture or a movie in the data. The analysis may be executed using a face-image identifying method as disclosed in Japanese Patent Application Publication No. 2005-266981, or Japanese Patent No. 4,218,348, which is incorporated by reference.

In some example embodiments, the data analyzing unit 201 may also analyze one or more search word(s) to search desired data from plural storage devices. The search word(s) may be provided from an input device connected to the computer device or an external device, such as a client computer connected to the computer device via a network.

The search word(s) may be input in the form of text or speech. In case of the text, the language of the search word may be identified by the text language identification method as described above. In case of the speech, the language of the search word may be identified by the speech-language identification method as described above. In some example embodiments, the data analyzing unit may analyze data having any other features, a music title of music, an artist name of music, a landscape name of a picture or movie.

In some example embodiments, the data analyzing unit 201 may analyze a used language set in a client computer that requests a data search in plural storage devices. Specifically, the computer device 200 may receive information which indicates set language in the operation system at the client computer, and the data analyzing unit 201 may be configured to analyze the set language at the client computer. The data analyzing unit 201 may analyze the language that is frequently used at the client computer to search based on the past search log. For example, the analyzing unit 201 may be configured to collect a search word log corresponding to the client computer that requests a data search, and determine the language based on the log.

In some example embodiments, the associating unit 202 may be configured to associate data with at least one geographical characteristic based on the data analysis by the data analyzing unit 201. The geographical characteristics may include any information regarding geography, such as continent, country, city, region, place, address, latitude, and/or longitude. The geographical characteristic may be a tag which is either added to the data or separate from the data. If the tag is separate from the data, the associating unit may be configured to store tag information corresponding to the data.

In some example embodiments, the associating unit 202 may associate data with one or more geographical characteristic(s) corresponding to the language of the data which is identified by the data analyzing unit 201. In some examples, one or more geographical characteristic(s) corresponding to the language can be spoken areas of the language. For example, if the data analyzing unit 201 identifies the language as Japanese, then the associating unit 202 may associate the data with Japan and/or Tokyo. If the data analyzing unit 201 identifies the language of the data as Portuguese language, then the associating unit 202 may associate the data with Portugal and/or Brazil.

In some example embodiments, the associating unit 202 may associate data with one or more geographical characteristic(s) corresponding to at least the music-genre which is identified by the data analyzing unit 201. In some examples, one or more geographical characteristic(s) corresponding to the music-genre can be places of origin of the music-genre, and/or popular areas of the music-genre. For example, if the data analyzing unit 201 identifies the music-genre of the data as Tango, then the associating unit 202 may associate the data with Argentina, Buenos Aires and/or Uruguay.

In some example embodiments, the associating unit 202 may associate data with one or more geographical characteristic(s) corresponding to at least the race which is identified by the data analyzing unit 201. In some example, one or more geographical characteristic(s) corresponding to the race can be main areas where many people of the race live. For example, if the data analyzing unit 201 identifies the race of face image in the data as Mongoloid, then the associating unit 202 may associate the data with places where Mongoloid may mostly live, such as East Asian countries.

In some example embodiments, the associating unit 202 may associate not only data but a search word and used language with at least one geographical characteristic based on the analysis by the data analyzing unit 201. The associating unit may associate the search word with at least one geographical characteristic based on the language of the search word. An example associating unit may include a geographical characteristic database. The geographical characteristic database may store geographical characteristic corresponding to language, music-genre, or race.

The allocating unit 203 may be configured to allocate the data to at least one of the plurality of storage devices based on the geographical characteristic of the data which is associated by the associating unit. In some example embodiments, the allocating unit may allocate the data to the storage device associated with the same as the geographical characteristics of the data. In one example, the geographical characteristics of the storage device may indicate the geographical place of the storage device. In some example embodiments, the allocating unit may allocate plural data having same geographical characteristic to the same storage device. For example, if a set of data having same geographical characteristic is enormous quantity, the set of the data may be stored to the storage device having high-capacity. In one example, in case a set of data having the same geographical characteristic may be stored in different storage devices, these storage devices may be located closely, or be accessed efficiently each other.

The allocating unit may be configured to have information of storage device characteristic corresponding to each storage device, for example. The plurality of storage devices may be associated to information which may indicate characteristics of storage devices, such as geographical place of the storage device, memory capacity, framework of the storage device, and/or characteristics of data search frequency. The information regarding to geographical place of the storage device can be continent, country, city, region, area, address, building floor, room number, latitude, and/or longitude, for example. Examples of information regarding to framework of the storage device may be a cache memory, removable storage, non-removable storage, HDD, DVD, CD, for example. Examples of characteristics of data search frequency may be search frequency of geographical characteristics corresponding to data.

In some example embodiments, the allocating unit may allocate data associated with a geographical characteristic that is searched with high frequency to a storage device having better access efficiency for a client computer requesting a search of the data having a geographical characteristic of high frequency. In one example, the data is stored in a storage device which is geographically close to the client computer. In another example, the storage device may be a cache memory. In some example embodiments, data associated with a geographical characteristic that is searched with low frequency may be allocated to a storage device that is a removable media.

In some example embodiment, the allocating unit may connect a storage device information database which stores information of characteristics of storage devices, and refer it when a storage device which the data will be stored is determined. The storage device information database may be included in the computer device, or be outside of the computer device. The timing of allocating data by the allocating unit may not be limited. The data allocation can be performed when the data is newly received, or when one storage device memory become insufficient physical space, for example.

The searching unit 204 may be configured to search data in the plurality of storage devices in response to a request of a data search. The searching unit may be configured to receive one or more search word(s) with at least one geographical characteristic from the associating unit 202, and may be configured to determine which storage device is firstly searched based on the geographical characteristic of the search word. The searching unit may be configured to retrieve requested data from storage devices, and provide the data to a client computer that requests a data search. In an example embodiment, a storage device associated with the same geographical characteristic as the search word may be firstly searched. In another embodiment, the computer device may receive one or more search word(s) and at least one geographical characteristic corresponding to used language of a client computer requesting a search, and determine which storage device is firstly searched based on received geographical characteristic. In an example embodiment, a storage device associated with the same geographical characteristic as the used language may be firstly searched.

The searching unit may be configured to have information of storage device characteristic corresponding to each storage device, for example. In one example, the plurality of storage devices may be associated at least one geographical characteristic which represents stored data. In another example, the storage devices may be associated at least one geographical characteristic which indicates geographical place of the storage device. In another embodiment, the searching unit may refer a storage device information database described above.

In some example embodiments, if the data search of the first storage device is not successful, the searching unit 204 may be configured to secondly search a storage device that stores data including geographical characteristic of high frequency search from a client computer requesting a data search.

In some embodiments, a client computer that requests a data search may be the same device as the computer device 200. In other words, the search word may be received from an input device, such as a keyboard, or microphone connected to the computer device 200.

Figure 3:
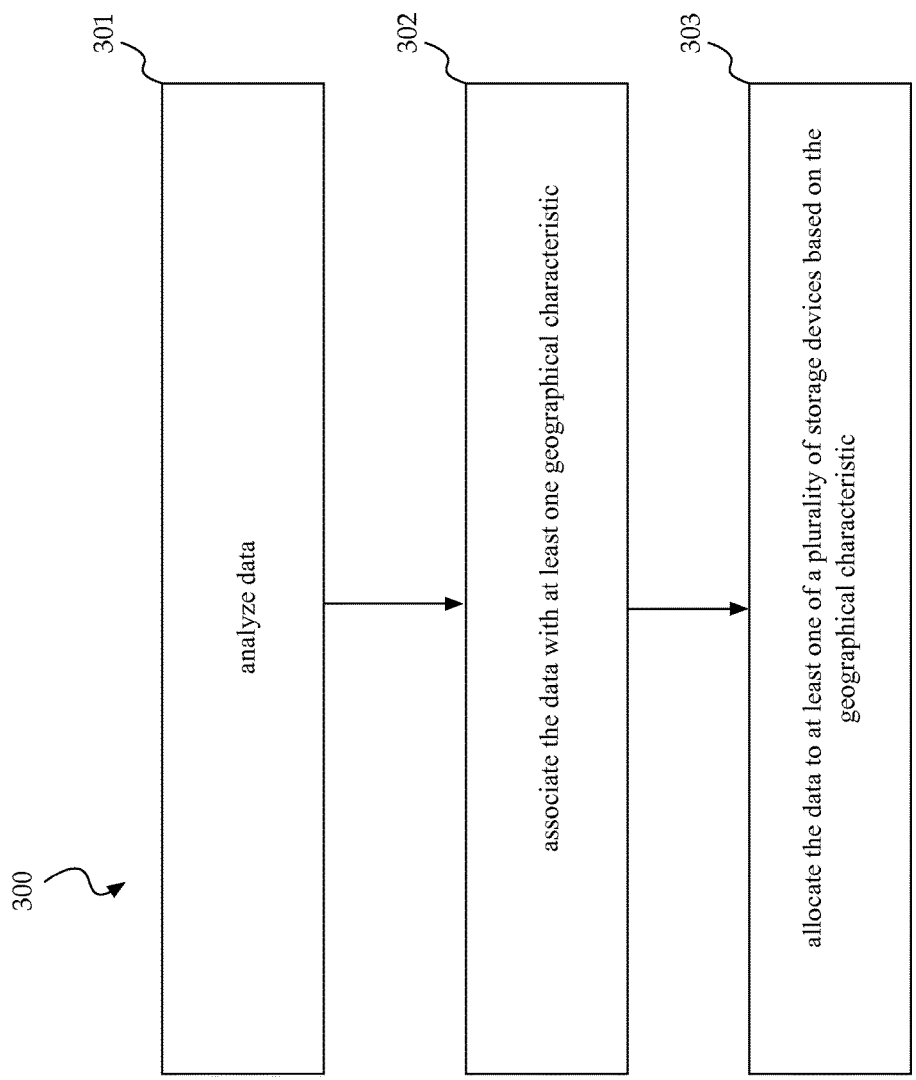
FIG. 3 is a flowchart depicting an example method of allocating data to at least one of a plurality of storage devices.

FIG. 3 is a flowchart depicting an example method 300 of allocating data to at least one of a plurality of storage devices that is arranged in accordance with at least some embodiments of the present disclosure. Example methods 300 may include one or more operations, functions, or actions as illustrated by blocks 301 through 303. Although illustrated as discrete blocks 301-303, the various blocks are illustrative partitions in an example method. The example method 300 may begin at block 301, which may include analyzing data. At block 301, the data analyzing unit 201 may be configured to analyze the data. The example method may flow from block 301 to 302. Block 302 may include associating the data with at least one geographical characteristic. The associating unit 202 may be configured to associate the data with at least one geographical characteristic. Block 302 may be followed by block 303. Block 303 may include allocating the data to at least one of a plurality of storage devices based on the geographical characteristic. The allocating unit 203 may be configured to allocate the data.

In some embodiments, the geographical characteristic associated the data may be a tag which may be either added to the data or separate from the data. In some examples, the method may further include analyzing the data. The data may be associated with at least one geographical characteristic based on the data analysis. In one example, used language of text or sound in the data may be analyzed, and at least one geographical characteristic corresponding to the language may be associated. In another example, at least a music-genre of music in the data may be analyzed, and at least one geographical characteristic corresponding to at least the music-genre may be associated. In an example embodiment, a race of a face image of a picture or movie in the data may be analyzed, and at least one geographical characteristic corresponding to the race may be associated. In some embodiments, the data may be allocated to the storage device associating with the same geographical characteristics. Furthermore, geographical characteristics of the storage device may indicate the geographical place of the storage device.

In some example embodiments, the method may further include searching data in the plurality of storage devices. The searching unit 204 may be configured to search data. In one example embodiment, the method may further include analyzing a language of a search word, and associating the search word with at least one geographical characteristic base on the language. A storage device associated with the same geographical characteristic as the search word may be firstly searched. In another example, the method may further include analyzing a used language set in a client computer that requests a data search, and associating the used language with at least one geographical characteristic. A storage device associated with same geographical characteristic as the used language may be firstly searched.

In one embodiment, data associated with a geographical characteristic that is searched with high frequency may be stored in a cache memory. In another embodiment, data associated with a geographical characteristic that is searched with low frequency may be allocated in a removable media.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
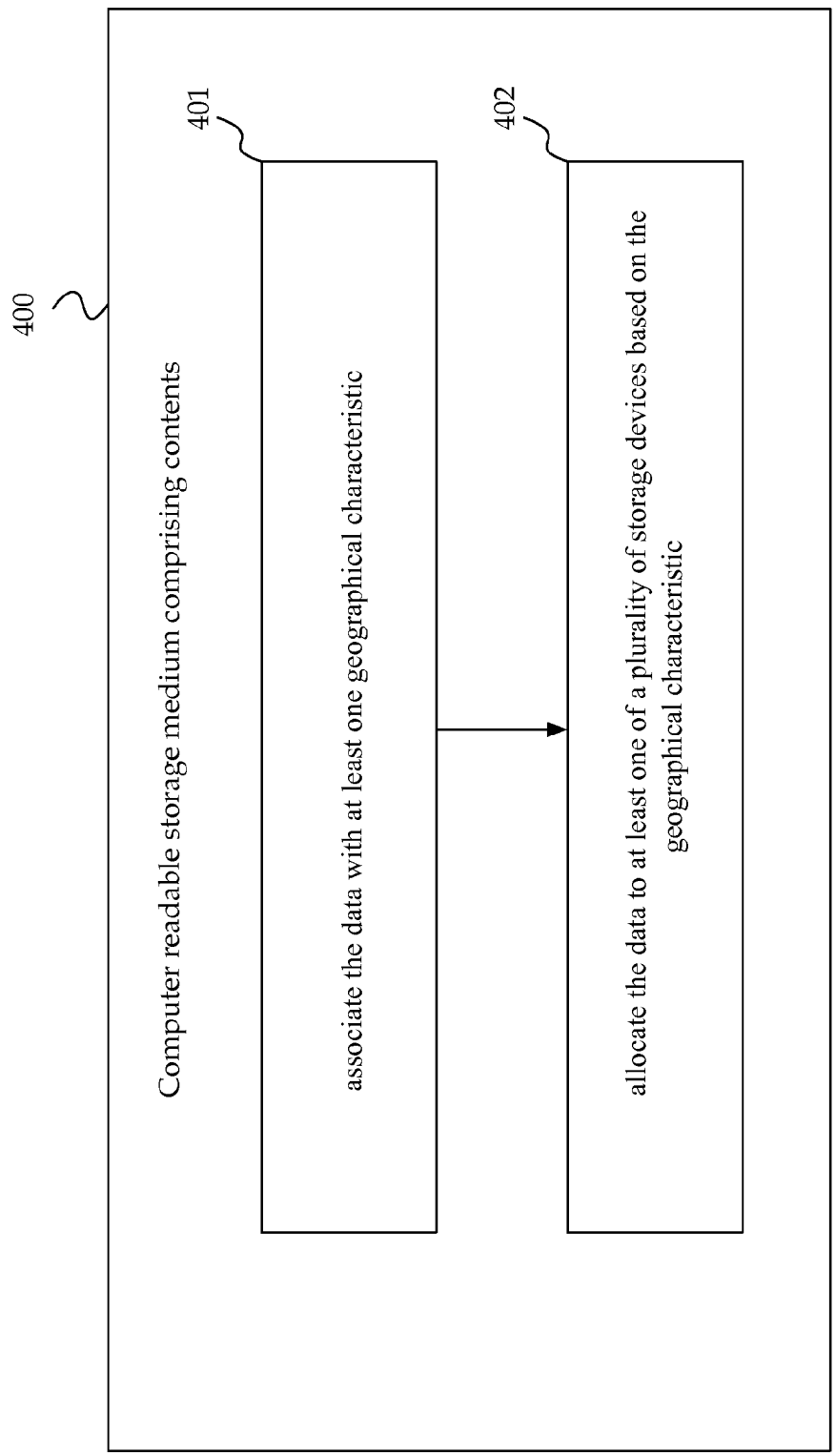
FIG. 4 is a schematic diagram of an example computer readable storage medium including contents.

FIG. 4 is a schematic diagram of an example computer readable storage medium 400 including contents arranged in accordance with at least some embodiments of the present disclosure. When executed by a computer, contents of the computer readable storage medium may cause the computer to associate data with at least one geographical characteristic (operation 401); and allocate the data to at least one of a plurality of storage devices based on the geographical characteristic (operation 402).

Figure 5:
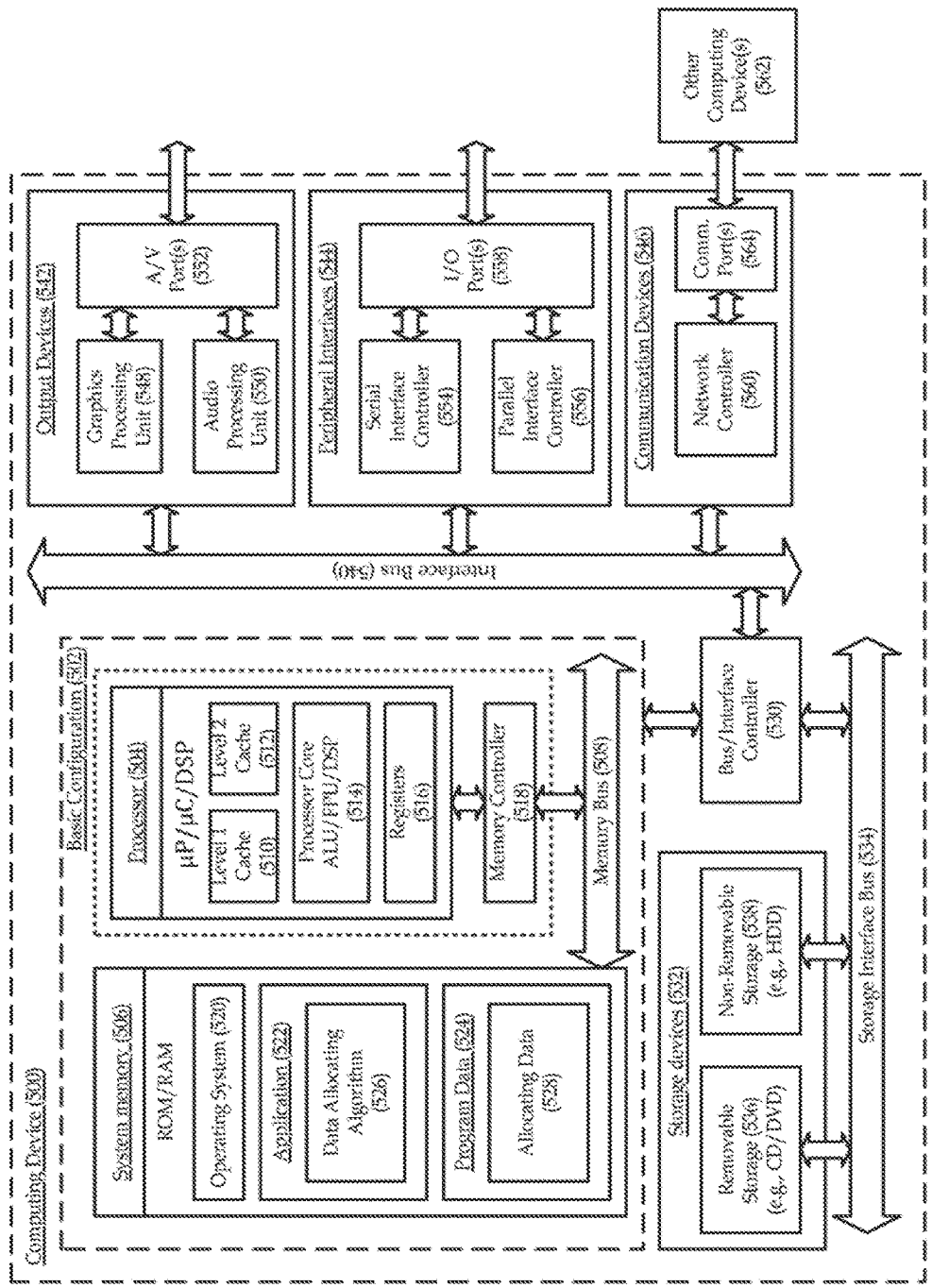
FIG. 5 is a block diagram illustrating an example computing device that may be arranged for data allocating, all arranged in accordance with at least some embodiments of the present disclosure.

FIG. 5 is a block diagram illustrating an example computing device 500 that is arranged for data allocating in accordance with the present disclosure. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one or more levels of caching, such as a level one cache 510 and a level two cache 512, a processor core 514, and registers 516. An example processor core 514 may include an arithmetic logic unit (ALU), a floating point unit (FPU), a digital signal processing core (DSP core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include a data allocating algorithm 526 that is arranged to associate data with at least one geographical characteristic and allocate the data to at least one of plurality of storage devices. Program data 524 may include allocating data 528 (such as geographical characteristic) that may be useful for allocating the data to an appropriate storage device as is described herein. In some embodiments, application 522 may be arranged to operate with program data 524 on an operating system 520 such that data may be efficiently allocated to an appropriate storage device in accordance with various methods described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD), a digital versatile disc (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method to allocate data to at least one of a plurality of storage devices, the method comprising:
   in response to receiving the data via a network, determining, by a computer, the plurality of storage devices to store the received data, wherein the received data includes new data or data that was previously stored in at least some of the plurality of storage devices and that is to be reallocated to another one of the plurality of storage devices based on a geographic characteristic, and wherein the determining includes:
   analyzing content of the received data, wherein the analyzing includes determining a language in which a text file of the content is written or in which an audio file of the content is recorded;
   assigning the received data to at least one geographical place that corresponds to the determined language; and
   in response to the assignment of the received data, identifying at least one storage device of the plurality of storage devices that is located at a geographical place that is same as the at least one geographical place that is assigned to the received data, wherein each storage device of the plurality of storage devices is located at a respective geographical place;
storing the received data to the identified at least one storage device of the plurality of storage devices;
receiving a request for a data search that includes one or more search words;
determining a language of the one or more search words;
assigning the one or more search words to the at least one geographical place, which corresponds to the determined language;
in response to the assignment of the one or more search words, identifying the at least one storage device of the plurality of storage devices, which is assigned to same at least one geographical place where the one or more search words are assigned;
searching, in response to the received request for the data search, the received data in the identified at least one storage device of the plurality of storage devices,
wherein the data associated with the geographical characteristic that is searched with high frequency is stored in a cache memory of the at least one storage device of the plurality of storage devices, and wherein the data associated with the geographical characteristic that is searched with low frequency is allocated in a removable media of the at least one storage device of the plurality of storage devices;
retrieving, based on the searching, requested data from the identified at least one storage device of the plurality of storage devices; and
providing the retrieved data to a client computer that sent the request for the data search.

2. The method of claim 1, wherein the assigning the received data to the at least one geographical place includes assigning the received data to a tag.

3. The method of claim 2, wherein the assigning the received data to the tag includes either adding the tag to the received data or providing the tag separate from the received data.

4. The method of claim 1, wherein:
the analyzing further includes determining a music-genre of a music file, and
the assigning further includes assigning the received data to at least one geographical place that corresponds to the determined music-genre.

5. The method of claim 1, wherein:
the analyzing further includes determining a race of a person depicted in a picture file or a video file, and
the assigning further includes assigning the received data to at least one geographical place that corresponds to the determined race.

6. A non-transitory computer-readable medium that stores executable instructions that, in response to execution, cause one or more processors to perform or control performance of operations to:
in response to receipt of data via a network, determine, by a computer, a plurality of storage devices to store the received data, wherein the received data includes new data or data that was previously stored in at least some of the plurality of storage devices and that is to be reallocated to another one of the plurality of storage devices based on a geographic characteristic, wherein the determination includes:
analysis of content of the received data, wherein the analysis includes determination of a language in which a text file of the content is written or in which an audio file of the content is recorded,
assignment of the received data to at least one geographical place that corresponds to the determined language, and
in response to the assignment of the received data, identifying at least one storage device of the plurality of storage devices that is located at a geographical place that is same as the at least one geographical place that is assigned to the received data, wherein each storage device of the plurality of storage devices is located at a respective geographical place;
store the received data to the identified at least one storage device of the plurality of storage devices;
identify a request for a data search that includes one or more search words;
determine a language of the one or more search words;
assign the one or more search words to the at least one geographical place, which corresponds to the determined language;
in response to the assignment of the one or more search words, identify the at least one storage device of the plurality of storage devices, which is assigned to same at least one geographical place where the one or more search words are assigned;
search, in response to the request for the data search, the received data in the identified at least one storage device of the plurality of storage devices,
wherein the data associated with the geographical characteristic that is searched with high frequency is stored in a cache memory of the at least one storage device of the plurality of storage devices, and wherein the data associated with the geographical characteristic that is searched with low frequency is allocated in a removable media of the at least one storage device of the plurality of storage devices;
retrieve, based on the search, requested data from the identified at least one storage device of the plurality of storage devices; and
provide the retrieved data to a client computer that sent the request for the data search.

7. The non-transitory computer-readable medium of claim 6, wherein the assignment of the received data to the at least one geographical place includes assignment of the received data to at least one tag that indicates the at least one geographical place.

8. The non-transitory computer-readable medium of claim 6, wherein:
the analysis further includes determination of at least a music-genre of a music file, and
the assignment of the received data to the at least one geographical place includes assignment of the received data to at least one geographical place that corresponds to the determined music-genre.

9. The non-transitory computer-readable medium of claim 6, wherein:
the analysis further includes determination of a race of a person depicted in a picture file or a video file, and
the assignment of the received data to the at least one geographical place includes assignment of the received data to at least one geographical place that corresponds to the determined race.

10. The non-transitory computer-readable medium of claim 6, wherein the executable instructions comprise instructions that, in response to execution, cause the one or more processors to perform or control performance of at least one operation to:

analyze a language used by the client computer that sent the request for the data search;
assign the used language to the at least one geographical place; and
search for the at least one storage device of the plurality of storage devices that is located in the at least one geographical place.

11. A system to allocate data, the system comprising:
a plurality of storage devices configured to store the data, wherein each storage device of the plurality of storage devices is located at a respective geographical place; and
a computer device that comprises a processor, wherein the computer device is configured to:
  in response to receipt of the data via a network, determine the plurality of storage devices to store the received data, wherein the received data includes new data or data that was previously stored in at least some of the plurality of storage devices and that is to be reallocated to another one of the plurality of storage devices based on a geographic characteristic,
  wherein to perform the determination, the computer device is configured to:
    analyze content of the received data, wherein the analysis includes determination of a language in which a text file of the content is written or in which an audio file of the content is recorded;
    assign the received data to at least one geographical place that corresponds to the determined language; and
    in response to the assignment of the data, identify at least one storage device of the plurality of storage devices that is located at a geographical place that is same as the at least one geographical place that is assigned to the received data, wherein each storage device of the plurality of storage devices is located at a respective geographical place;
  store the received data in the identified at least one storage device of the plurality of storage devices;
  receive a request for a data search that includes one or more search words;
  determine a language of the one or more search words;
  assign the one or more search words to the at least one geographical place, which corresponds to the determined language;
  in response to the assignment of the one or more search words, identify the at least one storage device of the plurality of storage devices, which is assigned to same at least one geographical place where the one or more search words are assigned;
  search, in response to the request for the data search, the received data in the identified at least one storage device of the plurality of storage devices,
  wherein the data associated with the geographical characteristic that is searched with high frequency is stored in a cache memory of the at least one storage device of the plurality of storage devices, and wherein the data associated with the geographical characteristic that is searched with low frequency is allocated in a removable media of the at least one storage device of the plurality of storage devices;
  retrieve, based on the search, requested data from the identified at least one storage device of the plurality of storage devices; and
  provide the retrieved data to a client computer that sent the request for the data search.

* * * * *